Aug. 29, 1933.  P. F. SCOFIELD  1,924,462
PORTABLE CURRENT SUPPLY
Filed Oct. 4, 1932  2 Sheets-Sheet 1
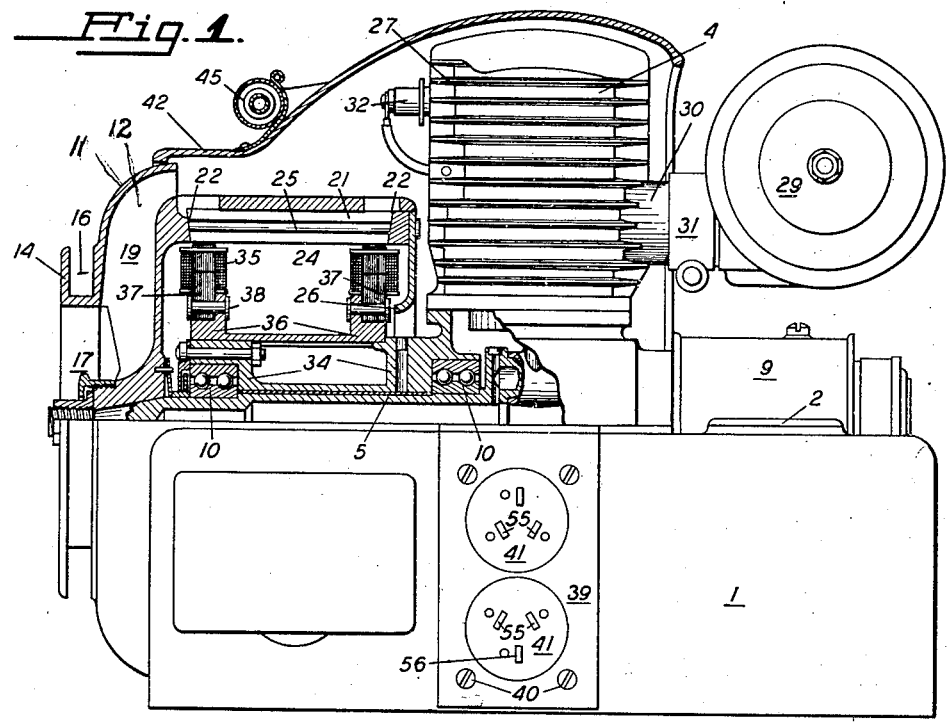
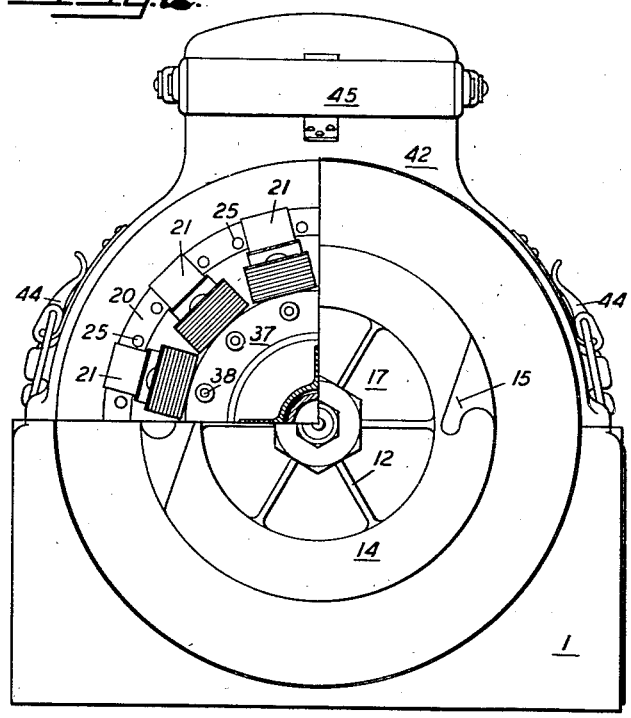
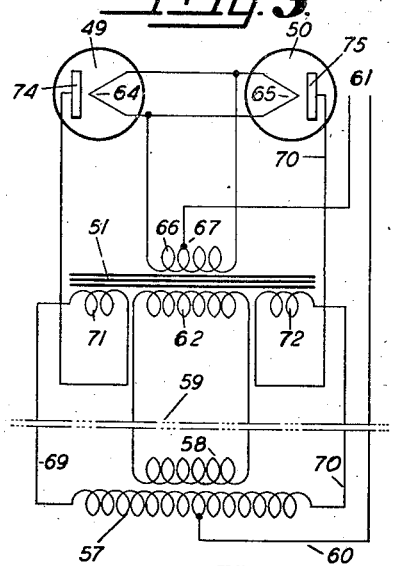
INVENTOR,
PHILIP F. SCOFIELD.
BY Donald K. Lippincott
ATTORNEY Aug. 29, 1933.　　　P. F. SCOFIELD　　　1,924,462
PORTABLE CURRENT SUPPLY
Filed Oct. 4, 1932　　　2 Sheets-Sheet 2
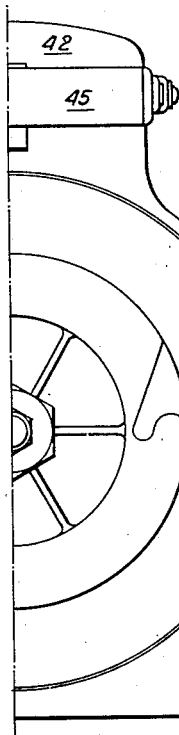
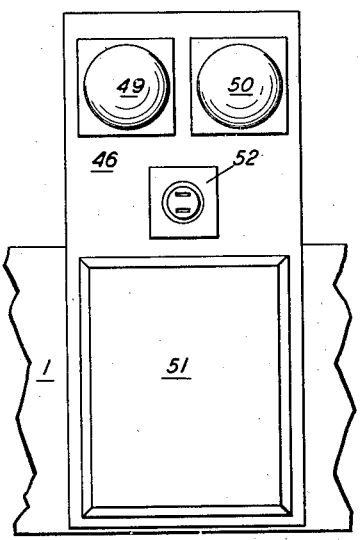
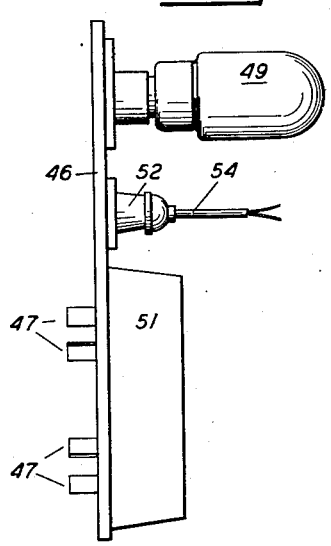
INVENTOR,
PHILIP F. SCOFIELD.
BY
ATTORNEY Patented Aug. 29, 1933

1,924,462

UNITED STATES PATENT OFFICE 1,924,462

PORTABLE CURRENT SUPPLY

Philip F. Scofield, Palo Alto, Calif., assignor to Heintz & Kaufman, Ltd., San Francisco, Calif., a corporation of Nevada Application October 4, 1932. Serial No. 636,231

4 Claims. (Cl. 290—1)

My invention relates to a portable current supply, and more particularly to a portable engine-driven alternator of light weight having a receptacle which may be used for alternating current withdrawal, or for attachment of a rectifier panel to form a unitary D. C. source.

Among the objects of my invention are: To provide a compact, portable power unit adapted for the production of A. C. or D. C.

To provide a source of alternating and direct current for use on exploratory expeditions, in aircraft, or other places distant from commercial mains.

To provide a detachable rectifier unit which may be attached to a portable engine-driven alternator whereby D. C. is made available for use.

To provide a portable A. C. and D. C. current source which cannot be harmed by overloads.

Other objects of my invention will be apparent or will be specifically pointed out in the description forming a part of this specification, but I do not limit myself to the embodiment of my invention herein described, as various forms may be adopted within the scope of the claims.

The problem of a current supply for radio transmitters and for other useful purposes, in exploratory expeditions is one which has occupied the attention of all explorers, particularly when airplane transport places a premium on weight. Batteries are out of the question; wind-driven generators are useless upon a forced landing. My invention was perfected to supply a complete portable and light weight source of both A. C. and D. C. for such expeditions; and one which has proved highly successful in practice.

Broadly speaking my invention comprises a compact portable and self-sufficient engine-driven alternator unit having a receptacle mounted thereon, and a detachable rectifier panel which may be inserted in the receptacle. The device may be used therefore, as a unitary A. C. or D. C. source depending upon the attachment of the rectifier panel.

The A. C. may be used directly for the operation of a complete radio transmitter and receiver, which may utilize high voltage by transformation of the A. C. or be used with the rectifier for starting cold plane engines, operating electric drills, or for other purposes where D. C. is necessary.

In the drawings forming a part of this specification, and attached thereto,

Figure 1 is a side view, partly in elevation and partly in section of a portable engine-driven alternator unit.

Figure 2 is an end view of the same, partly in elevation and partly in section.

Figure 3 is a schematic wiring diagram of a rectifier circuit which may be used to obtain D. C. from the alternator.

Figure 4 is a front view of the generating circuit showing the rectifier panel attached to the generating unit.

Figure 5 is a plan view of the rectifier panel.

Figure 6 is a side view of the rectifier panel showing the prong plugs.

Referring directly to the drawings, illustrating a preferred embodiment of my invention as applied to an engine-driven alternator-rectifier combination, with special reference to Figure 1, a unitary base casting 1, is preferably hollow to form a fuel tank adapted to be filled through an opening shown covered by a cap 2. This base forms a foundation upon which is mounted an internal combustion engine comprising a cylinder 4, crank shaft 5, piston 6 and connecting-rod 7. One end of the shaft is extended to operate an ignition magneto 9, while the other end is extended through roller bearings 10—10 to a flywheel 11.

This flywheel is hollow and formed with integral fan blades 12, and a starting rim 14 provided with notches 15 for attachment of a starting rope, to be wound in the pulley space 16. The fan blades are so arranged as to draw air through openings 17 between the blades, and discharge that air through the interior space 19 of the flywheel, the air emerging near the inner periphery.

Formed integral with the flywheel is a field frame 20, extended back over the shaft. This frame supports a plurality of bar magnets 21 held securely in place by being provided with tapers 22 at each end, locked through pressure on an end ring 24 applied by bolts 25. A dust cover 26 protects the open end of the frame.

I prefer to form the entire flywheel and frame of aluminum or its alloys, and rely entirely on the weight of the bar magnets to give a flywheel effect. I also prefer to use chrome magnets giving high field densities, grinding them to strict size limits.

The cylinder 4 is cast with integral cooling fins 27 set parallel to the line of air flow. A muffler 29 is attached to the rear port pipe 30 centrally emerging from the rear of the cylinder, by a clamp 31. A spark plug 32 is centrally located in the front of the cylinder.

An extension sleeve 34 extends forward from the cylinder, holds the bearings 10—10 in place, and forms the foundation for two rings of armature coils 35, mounted on a double armature frame 36, by means of circular core laminations 37 extending around the frame, and held to it by rivets 38. The coils are secured to projections from these laminations.

The armature frame, with two sets of assembled coils, is positioned so that one set of coils is directly adjacent each end of the bar magnets, with a small air-gap.

The armature coils may then be electrically connected in any desired manner, and leads (not shown) brought out to a receptacle panel 39 held to the side of the base 1 by screws 40. This panel is provided with receptacles 41 for the attachment of pronged plugs, through which alternating current may be drawn.

An airtight cover 42 for direction of draft on the cylinder is fastened to the base 1 by lateral snaps 44 and is provided with a handle 45 by which the engine may be transported. This cover receives the air from the flywheel periphery, conducts it past the cylinder and empties it on the muffler, which is also finned for cooling, although these fins do not show in the drawings.

The mechanism as described is, therefore, a direct coupled, engine-driven alternator, designed to operate on the two-cycle principle.

In the specific embodiment shown I prefer to use twelve magnets, and two sets of coils of twelve each. I prefer, for purposes to be later described, to connect twenty coils in series with one receptacle 41, and to connect four in series with the remaining receptacle. At an engine speed of 4,000 R. P. M. the output is 300 watts, and the generator is practically self-regulating, inasmuch as it will stand direct short-circuit indefinitely without harm, and without greatly reducing the speed of the engine.

The engine completely loaded with fuel, in which the lubricating oil is dissolved, weighs only thirty-one pounds.

The 300 watts of energy are available for A. C. uses, and in order to make D. C. available, I have provided a separable rectifier panel 46, which on side carries prong plugs 47 exactly fitting the receptacles on the engine base.

This panel carries two rectifier bulbs 49 and 50, of the hot-cathode mercury vapor type, a cathode-control transformer 51 and a D. C. work circuit receptacle 52. I have indicated the attachment of a work circuit by a work circuit plug 54 in Figures 4 and 6.

In the receptacles 41 shown in Figure 1, I have indicated two live prong sockets 55 in each one, and I prefer to utilize the remaining prong socket 56 on the lower receptacle for a center tap of the twenty-coil series, leaving the remaining prong socket in the upper receptacle blank.

Figure 3 is a diagram, reduced to its lowest terms of a preferred rectifier circuit. The twenty-coil series of the generator is indicated by a long inductance 57 and the four-coil series as a short inductance 58. The line of separation between the rectifier panel and the generator is indicated by the broken lines 59.

I bring a center tap 60 of the twenty-coil series directly out as one leg of the D. C. work circuit 61.

The output of the four coils goes directly to a primary 62 of the transformer 51. The cathodes 64 and 65 of the two rectifier tubes are connected in parallel and to a secondary winding 66 of the transformer. A center tap 67 on this secondary winding forms the other leg of the D. C. work circuit 61.

Leads 69 and 70 from the twenty-coil series pass through auxiliary windings 71 and 72 mounted as additional primaries in aiding relation to the secondary winding 66, and then go to anodes 74 and 75 of the rectifiers through leads 76 and 77. These leads provide rectifier excitation, and the complete circuit constitutes a full-wave rectifier, supplying unfiltered D. C. to the work circuit 61. The pulsations, however, are of such relatively high frequency that motors, drills, and other devices designed for D. C. operation will operate perfectly. The transformer arrangement as described, provides means for supplying current to the cathodes from the anodes, when excess loads are thrown on the generator.

The current source as above described supplies all demands for a portable A. C. and D. C. source. As an example, the unit may be used to supply A. C. to a self-rectifying vacuum tube radio transmitter either in the air, or in case of a forced landing, and, by the addition of the rectifier, can be used to start the airplane engines, through the medium of their starting motors.

I claim:

1. In combination a portable engine-driven alternator, a receptacle mounted thereon, a separable rectifier panel adapted to fit said receptacle, and means for attaching a D. C. work circuit to said rectifier.

2. In combination, a portable internal combustion engine, an alternator directly connected to said engine, a receptacle mounted on said alternator, a rectifier panel having prongs whereby it may be attached to said receptacle to form with said alternator a portable D. C. source.

3. In combination, a base adapted for fuel storage, an engine-driven alternator mounted on said base, a receptacle connected to said alternator mounted on said base, a rectifier panel separably mounted on said receptacle, and means for attaching a D. C. work circuit to said rectifier.

4. In combination, a base adapted for fuel storage, an engine-driven alternator mounted on said base, a receptacle connected to said alternator mounted on said base, a rectifier panel separably mounted on said receptacle to provide a D. C. source when attached and allowing access to the A. C. source when detached.

PHILIP F. SCOFIELD.